(12) United States Patent
Bellato et al.

(10) Patent No.: US 11,060,634 B2
(45) Date of Patent: Jul. 13, 2021

(54) MEDIA CONTROL VALVE TANK TESTING APPARATUS AND METHOD

(71) Applicant: Abrasive Blasting Service & Supplies Pty Ltd, Victoria (AU)

(72) Inventors: John Bellato, Victoria (AU); Tass Kelaiditis, Victoria (AU)

(73) Assignee: Abrasive Blasting Service & Supplies Pty Ltd, Victoria (AU)

( * ) Notice: Subject to any disclaimer, the term of this patent is extended or adjusted under 35 U.S.C. 154(b) by 0 days.

(21) Appl. No.: 16/461,926

(22) PCT Filed: Nov. 20, 2017

(86) PCT No.: PCT/AU2017/000242
§ 371 (c)(1),
(2) Date: May 17, 2019

(87) PCT Pub. No.: WO2018/090075
PCT Pub. Date: May 24, 2018

(65) Prior Publication Data
US 2019/0277426 A1    Sep. 12, 2019

(30) Foreign Application Priority Data

Nov. 18, 2016  (AU) ............................... 2016904730

(51) Int. Cl.
*F16K 39/04*   (2006.01)
*F16K 3/24*    (2006.01)
(Continued)

(52) U.S. Cl.
CPC ................ *F16K 39/04* (2013.01); *B24C 7/00* (2013.01); *F16K 3/243* (2013.01); *F16K 3/246* (2013.01);
(Continued)

(58) Field of Classification Search
CPC .......... F16K 39/04; F16K 3/243; F16K 3/246; F16K 31/1221
See application file for complete search history.

(56) References Cited

U.S. PATENT DOCUMENTS 5,401,205 A * 3/1995 Shank, Jr. ............. B24C 7/0053
                                                    451/101
5,810,045 A    9/1998 Evans
(Continued)

FOREIGN PATENT DOCUMENTS

WO   2002038337 A1   5/2002
WO   2018090075 A1   5/2018

*Primary Examiner* — Kevin R Barss
(74) *Attorney, Agent, or Firm* — Kwan & Olynick LLP

(57) ABSTRACT

There is described a media metering valve (18) comprising a main body (21) having a media inlet (26), a central bore (24) extending through the main body (21), said media inlet (26) being in communication with the central bore (24) and a chamber (28) formed in communication with the central bore (24). A base member (23) attachable to the main body (21), the base member (23) having a central passage (27) extending therethrough, said central passage (27) extending orthogonal to the central bore (24) of the main body and being in fluid communication with said central bore (24). A cap member (22) is mounted to the main body (21) so as to substantially enclose the chamber (28). A piston (30) is movably mounted within the chamber (28). The piston (30) having a plunger member (31) rigidly connected thereto, the plunger member (31) being positioned within the central bore (24) to move in a reciprocal manner therein under action of the piston (30). A bypass member (40) is sealingly mounted about said plunger (31) member to provide a seal between the chamber (28) and the central bore (24). Pressurised air is delivered to said central passage (27) of the base member (23) to receive media delivered from the media inlet (26) when the plunger member (31) is in an open (Continued)

position. Wherein, upon the seal between the chamber (28) and the central bore (24) becoming compromised the bypass member (40) functions to equalise air pressure between the chamber (28) and the central bore (24) to minimise the egress of air and media from the central bore (24) to the chamber (28).

7 Claims, 4 Drawing Sheets

(51) Int. Cl.
  *F16K 31/122* (2006.01)
  *F16K 41/04* (2006.01)
  *B24C 7/00* (2006.01)
(52) U.S. Cl.
  CPC .......... *F16K 31/1221* (2013.01); *F16K 41/04* (2013.01); *B24C 7/0069* (2013.01)

(56) References Cited

U.S. PATENT DOCUMENTS

| | | | |
|---|---|---|---|
| 6,607,175 B1 * | 8/2003 | Nguyen | B24C 7/0046 137/553 |
| 7,300,336 B1 * | 11/2007 | Nguyen | B24C 7/0053 451/101 |
| 2008/0190499 A1 | 8/2008 | Nguyen | |
| 2013/0105717 A1 | 5/2013 | Nguyen | |
| 2013/0157546 A1 | 6/2013 | Roden | |
| 2013/0319557 A1 | 12/2013 | Smith, III et al. | |

* cited by examiner

MEDIA CONTROL VALVE TANK TESTING APPARATUS AND METHOD

RELATED APPLICATIONS

The present application is a national phase entry of PCT Application No. PCT/AU2017/000242, filed on Nov. 20, 2017, which claims priority from Australian provisional patent Application No. 2016904730 filed 18 Nov. 2016. Each of these applications is incorporated herein by reference in their entirety for all purposes.

FIELD OF INVENTION

The present invention relates generally to a valve for introducing particulate material into a pressurised fluid stream, and in particular, to a media metering valve for introducing particulate media into a high pressure air stream in a controlled manner.

BACKGROUND OF THE INVENTION

For surface treatment applications such as abrasive blasting, abrasive materials are applied to a surface under pressure to treat the surface in a variety of ways. Typically the abrasive materials may be applied to the surface to remove imperfections or contaminants in a surface, to reshape or modify a surface, or to apply a texture to the surface which may be smoothed or roughened.

Such applications generally comprise a hopper or pot which stores the abrasive particulate material. The hopper or pot is generally connected to a source of high pressure fluid, such as air which functions to pressurise the hopper or pot and the particulate material contained therein. A mixing valve is generally located at the base of the hopper or pot so as to be in fluid communication with the pressurised particulate material contained therein and the mixing valve is generally connected within a line of pressurised air. In order to deliver the particulate material into the line of pressurised air, the mixing valve generally comprises a piston or plunger that is movable within a chamber to release the particulate material into the pressurised air stream in a controlled manner. As such, the pressurised fluid line that exits the mixing valve comprises a pressurised stream of air with particulate abrasive materials entrained therein. This stream can then be applied to a surface for cleaning or related treatment.

There are a variety of other applications that require metered delivery of particulate material into a pressurised air stream via a mixing valve. These applications include introducing catalytic cracking particles into fluid Catalytic cracking units in the petroleum industry, introducing particulate catalysts into other kind of chemical processes and spraying particulate material on adhesive substrates as part of a manufacturing process. Each of these applications requires a mixing valve to deliver the particulate material from a supply into a fluid stream.

A problem with existing mixing valves is that they must operate under extreme conditions, namely in the presence of high pressures and abrasive particles. As the valves comprise moving parts, namely air driven pistons or plungers whereby one side of the piston or plunger is at normal pressure with the end of the plunger being exposed to high pressure, the seals present on the moving plunger at this pressure interface are under considerable load. Failure of the seals will cause the high pressure air and any entrained abrasive particles to enter behind the piston or plunger which may be catastrophic for the valve, through the addition of abrasion and clogging of the valve.

The solution to this problem has generally resolved around providing a greater number of sealing rings and the like to prevent the migration of particulate material into the piston chamber of the valve. Whilst such a solution may increase the time between catastrophic failure of the valve by increasing the barriers between migration, failure will still occur and may be exacerbated due the prolonged period in which leakage may occur, resulting in significant abrasion and increases of particulate material into the piston chamber over time.

Thus, there is a need to provide an improved means for addressing the issue of valve seal failure to minimise damage to the piston chamber brought about by periods of exposure of the piston chamber to high pressure leakage of particulate material.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a media metering valve comprising:
 a main body having a media inlet, a central bore extending through the main body, said media inlet being in fluid communication with the central bore and a chamber formed in communication with the central bore;
 a base member attachable to the main body, the base member having a central passage extending therethrough, said central passage extending orthogonal to the central bore of the main body and being in fluid communication with said central bore;
 a cap member mounted to the main body so as to substantially enclose the chamber;
 a piston movably mounted within the chamber, the piston having a plunger member rigidly connected thereto, the plunger member being positioned within the central bore to move in a reciprocal manner therein under action of the piston; and
 a bypass member sealingly mounted about said plunger member to provide a seal between the chamber and the central bore;
 wherein pressurised air is delivered to said central passage of the base member to receive media delivered from the media inlet when the plunger member is in an open position, and wherein upon the seal between the chamber and the central bore becoming compromised the bypass member functions to equalise air pressure between the chamber and the central bore to minimise the egress of air and media from the central bore to the chamber.

In one embodiment, the bypass member is sealingly mounted about said plunger through the provision of one or more seals located about said plunger adjacent the bypass member. The one or more seals may be o-rings. In one form, one o-ring is provided and the o-ring is mounted about the plunger immediately upstream of the bypass member. In another form, two o-rings are provided, each o-ring being mounted about the plunger on opposing sides of the bypass member.

The seal between the chamber and the central bore may become compromised when the o-ring upstream of the bypass member begins to fail.

The bypass member may be configured to provide a plurality of gaps between a surface of the plunger member to facilitate the controlled release of pressurised air and media from the chamber to the central bore to equalise air pressure between the chamber and the central bore. The plurality of gaps formed between the surface of the plunger member and the bypass member is formed through the provision of a plurality of stepped recesses formed on an inner circumference of the bypass member.

The body of the bypass member may function as a barrier between the central bore and the chamber to minimise direct damage to the valve member due to the release of pressurised air and media from the chamber. The passage of pressurised air and media from the chamber and through the stepped recesses formed in the bypass member may generate a noise in the valve to confirm that a seal has been compromised.

Accordingly, in another aspect of the invention there is provided a method of facilitating controlled failure of a media metering valve for introducing media into a pressurised fluid stream, comprising:

providing a seal between the body of the valve and the pressurised fluid stream, said seal comprising a bypass member and at least one seal member; and upon failure of the at least one seal member, configuring the bypass member to facilitate pressure equalisation between the pressurised fluid stream and the valve through the controlled transfer of pressurised fluid through said bypass member.

In one embodiment of this aspect of the invention, the step of providing a seal comprises mounting the bypass member and the at least one seal member about a piston of a valve that communicates with the pressurised fluid stream.

In another embodiment of this aspect of the invention, the step of configuring the bypass member to facilitate pressure equalisation between the pressurised fluid stream and the valve comprises configuring the bypass member such that there are at least one or more gaps formed between an inner diameter of the bypass member and the piston of the valve for fluid to pass therethrough to facilitate pressure equalisation.

Accordingly, in yet another aspect of the invention there is provided a bypass member for facilitating controlled failure of a media metering valve for introducing media into a pressurised fluid stream, comprising:

a body adapted to be located about a piston of said media metering valve so as to be located adjacent one seal member for forming a seal about the piston to prevent pressurised fluid from passing along said piston from the pressurised fluid stream to a body of the media metering valve;

wherein the body is substantially ring shaped and an inner surface of body has one or more stepped regions formed therein to define a gap or space between the body and a surface of the piston to facilitate pressure equalisation when said seal member fails.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to an apparatus for abrasive blasting using that provides a stream of abrasive particles against a surface under high pressure to smooth a rough surface. However, it will be appreciated that the valve system of the present invention could equally be applied in any number of applications whereby there is a need to provide controlled delivery of a particulate material into a pressurised fluid stream, such as in catalytic cracking applications and other such applications.

Figure 1:
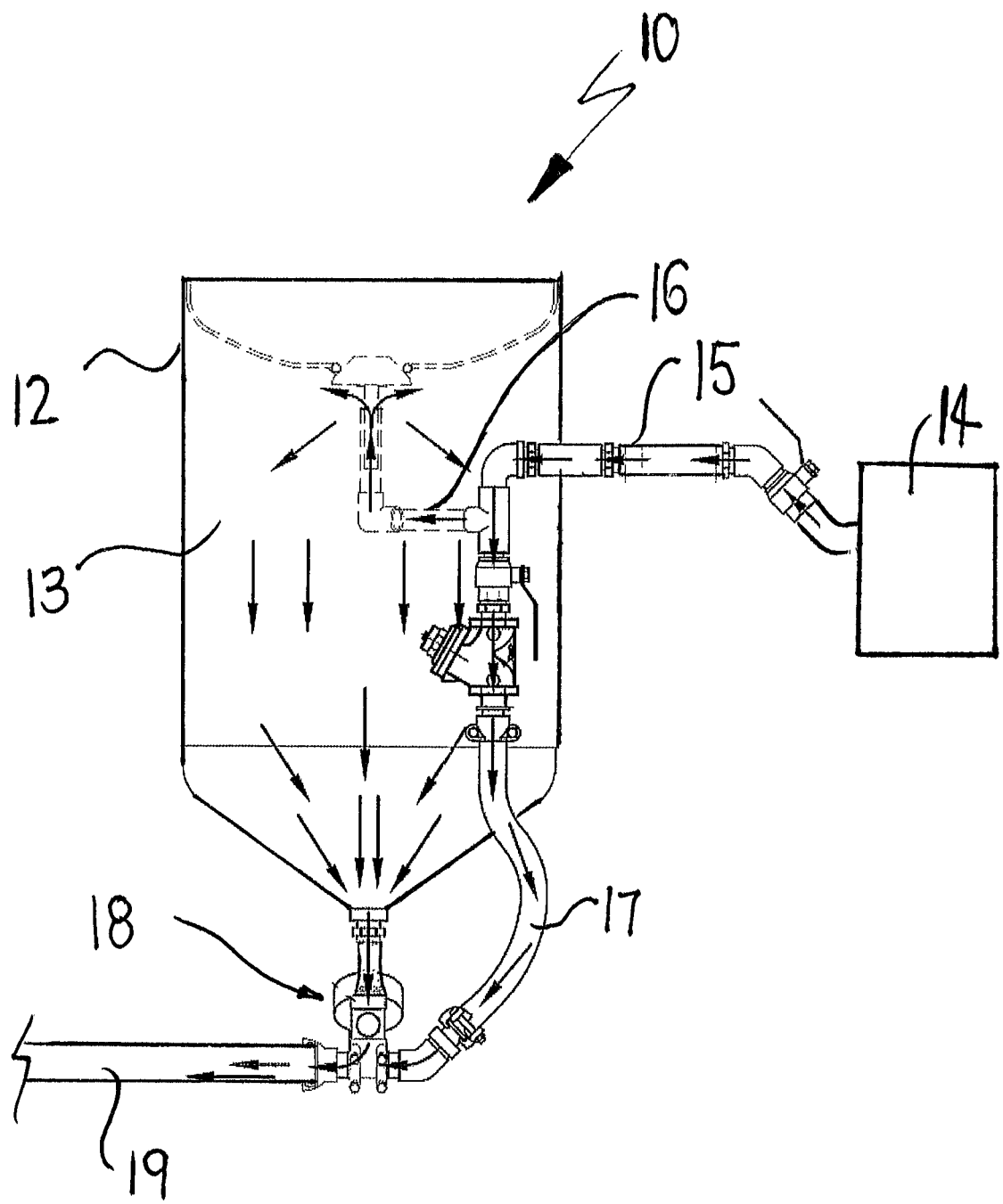
FIG. 1 is a simplified depiction of an abrasive blasting system suitable for use with the present invention in accordance with a first embodiment.

Referring to FIG. 1, an abrasive blasting system 10 employing a metering valve 18 in accordance with an embodiment of the present invention is depicted.

The abrasive blasting system comprises a media tank or pot 12 into which an abrasive media is received. The abrasive media may comprise any number of different types of materials depending upon the type and application of abrasive blasting to be undertaken. In some heavy abrasive applications the abrasive media may be a metal shot or sand, whilst for milder abrasive applications using a glass bead or even a backing soda medium may be employed.

The media tank or pot is in fluid communication with a pressurised fluid source 14. The pressurised fluid source 14 may be a source of pressurised air via an air pump or the like which delivers pressurised air along a primary flow path 15. The primary flow path 15 is connectable to a tank pressure line 16 such that pressurised air is able to flow into the media tank or pot 12 via the tank pressure line 16. This then causes the media tank or pot 12 to become pressurised.

The primary flow path 15 is in connection with the primary blast line 17 such that the pressurised air continues to flow therethrough. The primary blast line 17 is connected to the control valve 18 which is also connected to the pressurised media tank or pot 12. When the media tank or pot 12 achieves the desired pressure, the media 13 present therein flows by gravity feed through the metering valve 18 and into the main flow line 19 where it is entrained in the high pressure air and can be applied to a suitable surface via a nozzle or the like.

Figure 2:
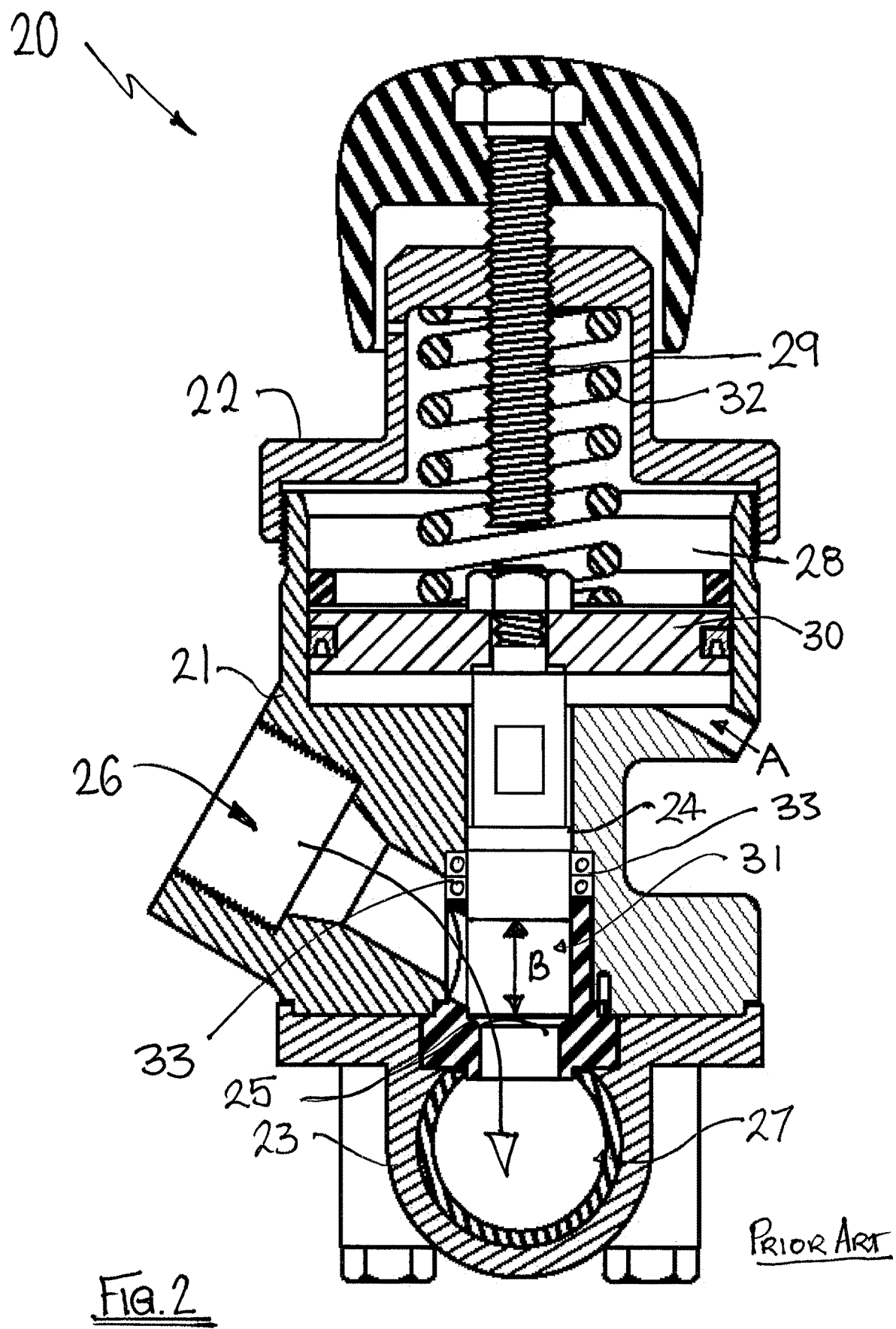
FIG. 2 is cross-sectional view of a prior art arrangement of a conventional metering valve.

As described above, it is the metering valve 18 that facilitates mixing of the abrasive 13 media into the man flow line 19 of the system. A conventional metering valve is depicted in FIG. 2 as reference 20. This valve is to be positioned in the same manner as valve 18 of FIG. 1 to introduce abrasive particulate material into a high pressure airstream.

The conventional metering valve 20 comprises a main body 21, a cap member 22 that threadingly engages with the main body 21 and a base 23.

The main body has a central bore 24 formed therein that opens to an expanded cylindrical chamber 25 formed in the upper end of the main body 21. A particulate material receiving port 26 extends through a side of the main body 21 in an angular configuration to communicate with the central bore 24 as shown. The receiving port 26 is configured to engage with the media tank or pot 12 so as to receive the media 13 therefrom, under pressure.

The base 23 comprises a flow tube 27 that extends in an orthogonal manner with respect to the central bore 24 of the main body 21, with the central bore 24 feeding into the flow tube 27 as shown. In use, the flow tube is in communication with the main flow line of the high pressure air supply such that pressurised air passing through the flow tube 27 receives the media 13 and becomes entrained with the media 13 as it passes away from the metering valve 20.

The cap member 22 is fitted to the upper end of the main body 21 so as to define an enclosed piston chamber 28 therein. A piston 30 is mounted to an end of the bolt 29 and is configured to travel within the piston chamber 28 as depicted. A plunger 31 is attached to an underside of the piston 30 and extends into the bore 24, such that in a fully extended position, the plunger 31 is seated at the end of the bore 24 in a sealed manner as shown. As the plunger 31 is rigidly connected to the piston 30 such that movement of the piston within the piston chamber 28 will cause the plunger 31 to move within the bore 24. A spring 32 is located between the top of the cap member and the upper surface of the piston 30 to provide a force that, when air pressure introduced into the piston chamber 28 is removed, forces the piston 30 in a downward manner so that the piston is at the bottom of the piston chamber 28, and the plunger 31 is fully extended to the bottom of the bore 24. Thus, by introducing pressurised air into the piston chamber 28, in the direction of arrow A, the piston 30 is able to rise within the piston chamber 28 to cause the plunger 31 to move up within the bore 24 in the direction of arrow B, thereby opening the bore 24 to the flow tube 27.

It will be appreciated that in a conventional metering valve 20, by raising the piston 30 the plunger 31 is also raised to open the passage between the particulate material receiving port 26 and the flow tube 27 such that the pressurised media will flow into the flow tube 27 to create a high pressure flow of air with media 13 entrained therein, for downstream delivered to a nozzle for application to a surface.

However, as previously discussed, it will be appreciated that when the plunger 31 is in an open or partially open position the pressure of the air and media 13 present in the lower regions of the bore 24 can pass into the gap between the plunger 31 and the bore 24 to deliver pressurised air and media 13 into the piston chamber 28. To prevent this, one or more seals 33 have traditionally been provided. As the pressure of the combined air and media in the lower region of the bore 24 is greater than the pressure of the air present in the piston chamber 28, should the one or more seals 33 fail, the combined pressurised air and media 13 will pass through the seal and into the piston chamber 28 under pressure, thereby potentially destroying the valve 20 and causing clogging of the valve 20 due to the ingress of the media 13. This can require significant effort to clean the valve 20, and in most instances, the valve 20 must be replaced.

Figure 3:
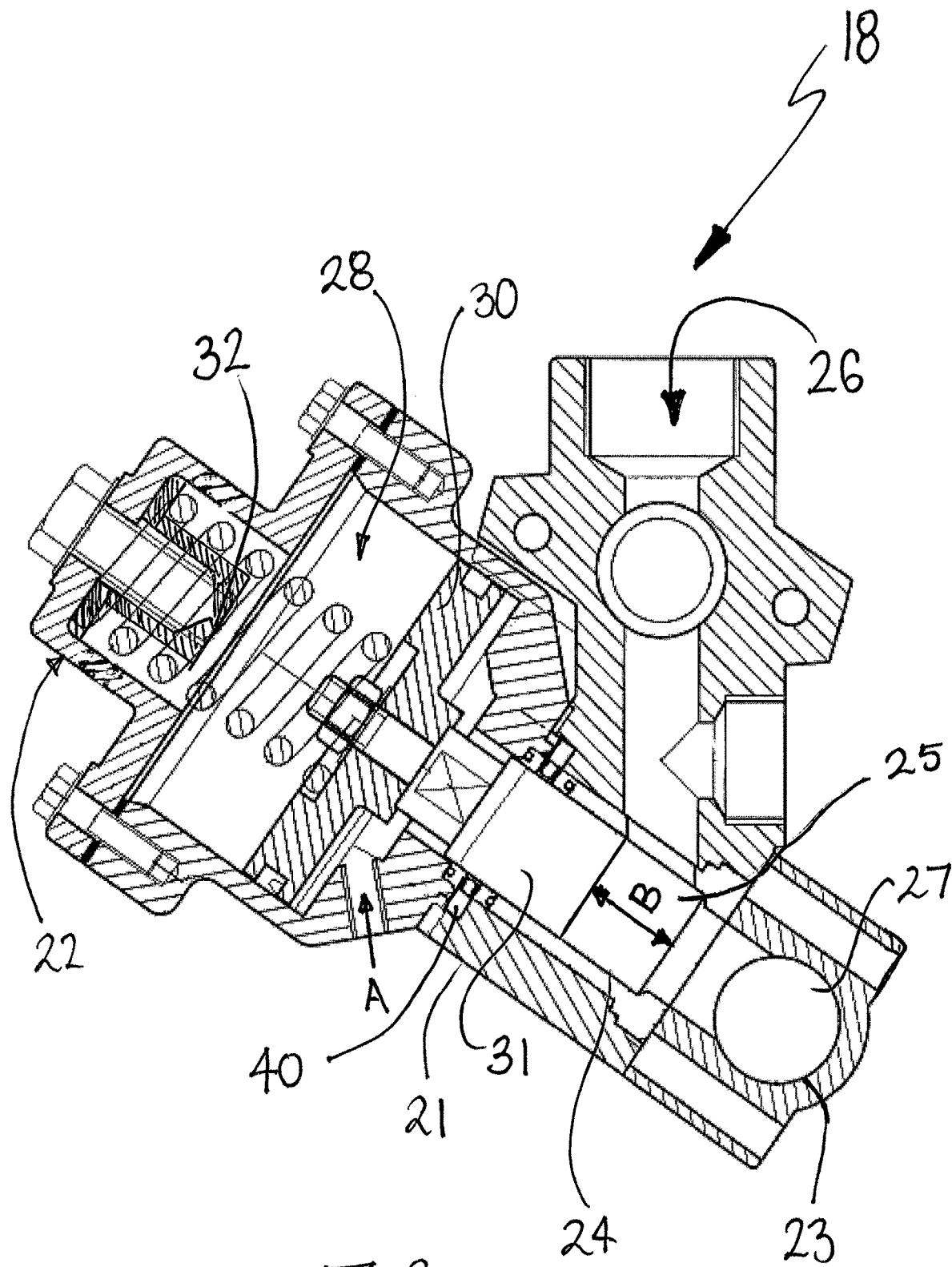
FIG. 3 is cross-sectional view of an embodiment of a metering valve in accordance with the present invention.

A metering valve 18 in accordance with an embodiment of the present invention is depicted in FIG. 3. This metering valve 18 operates on substantially the same principles as the metering valve 20 of FIG. 2, namely the use of a reciprocating piston 30 moving within a piston chamber 28 and a rigidly connected plunger 31 moving in a reciprocating manner in bore 24. For this reason, the same reference numerals will be used in FIG. 3 to refer to the same parts.

As is shown in FIG. 3, rather than multiple seals 33 used to prevent the ingress of media 13 and pressurised air into the piston chamber 28, the metering valve 18 of the present invention employs simple seals together with bypass member 40 as shown.

Figures 4A, 4B:
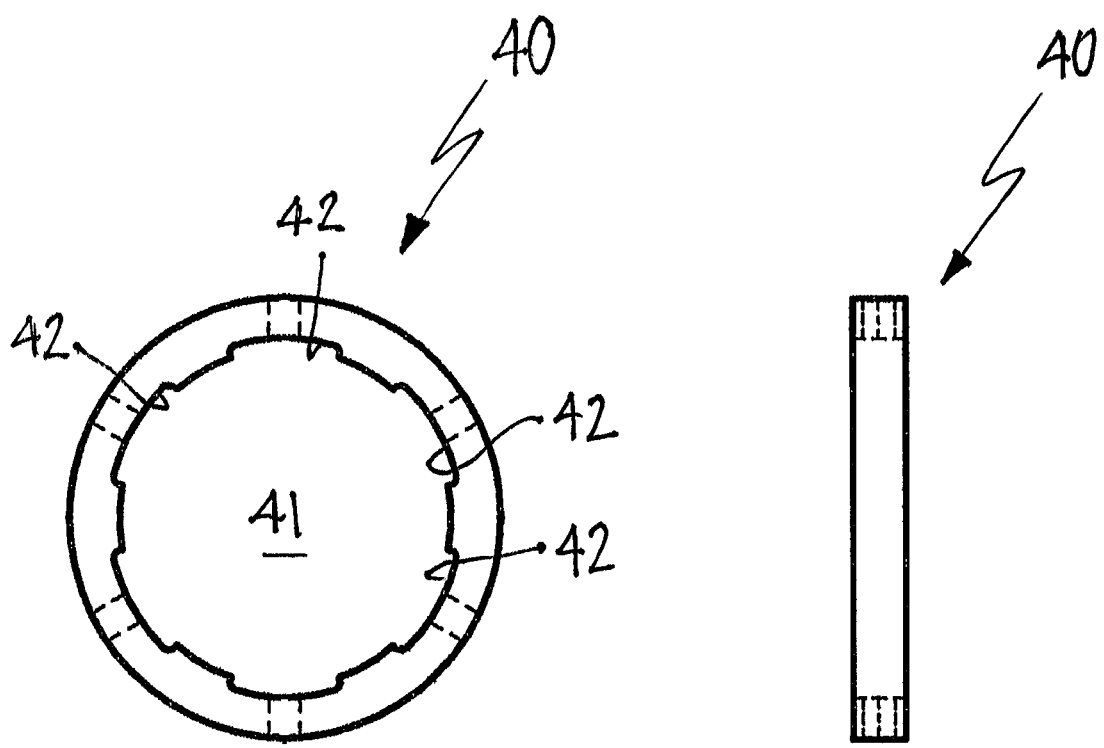
FIG. 4A and FIG. 4B are top and end views respectively of a bypass member for use in a metering valve in accordance with the present invention.

The bypass member 40 is shown in isolation in FIGS. 4A and 4B and is in the form of a nylon ring having a central bore 41 through which the plunger can pass. Whilst in the depicted embodiment, the bypass member 40 is made from plastic, in an alternative embodiment the bypass member may be made from a metal, such as brass or from any material considered suitable, as will be appreciated by those skilled in the art. The internal circumference of the bore 41 has a plurality of stepped recesses 42 formed therealong. When the bypass member 40 is positioned about the plunger 31 in the manner as shown in FIG. 3, the stepped recesses 42 provide a plurality of gaps or spaces between the bypass member 40 and the plunger 31. In this arrangement, once the integrity of the o-rings is compromised, the bypass member 40 enables a controlled amount of air and media 13 to readily pass into the piston chamber 28 to function to equalise pressure in the valve on either sides of the bypass ring 40. By providing such a simple controlled passage for equalising the pressure between the piston chamber 28 and the bore 24, air flow will quickly regulate and stop due to equalisation of the air pressure between the spaces.

In such a situation, the bypass members will generate a different sound to the operator of the device indicating that the seal has been compromised but the combination of the pressurised air with the media will not cause catastrophic failure of the metering valve 18 and once equalised the ingress of particulate material will cease.

It will be appreciated that rather than attempting to strengthen the seal between the piston chamber 28 and the bore 24, by providing a simple means for ensuring that any failure of the seal will quickly seek to equalise pressure between the piston chamber 28 and the bore 24, any damage to the valve 18 can be simply and effectively minimised.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:
1. A media metering valve comprising:
    a main body having a media inlet, a central bore extending through the main body, said media inlet being in communication with the central bore and a chamber formed in communication with the central bore;

a base member attachable to the main body, the base member having a central passage extending therethrough, said central passage extending orthogonal to the central bore of the main body and being in fluid communication with said central bore;

a cap member mounted to the main body so as to substantially enclose the chamber;

a piston movably mounted within the chamber, the piston having a plunger member rigidly connected thereto, the plunger member being positioned within the central bore to move in a reciprocal manner therein under action of the piston; and a bypass member mounted about said plunger member and configured to provide a plurality of gaps between a surface of the plunger member, the bypass member being positioned adjacent at least one o-ring, the at least one o-ring providing a seal between the chamber and the central bore, wherein pressurised air is delivered to said central passage of the base member to receive media delivered from the media inlet when the plunger member is in an open position, and wherein upon the seal between the chamber and the central bore becoming compromised through a failure of the at least one o-ring, the plurality of gaps provided in the bypass member facilitates controlled release of the pressurised air and media from the chamber to the central bore to equalise air pressure between the chamber and the central bore to minimise egress of air and media from the central bore to the chamber.

2. RAU The media metering valve according to claim 1, wherein one o-ring is provided and the o-ring is mounted about the plunger immediately upstream of the bypass member.

3. The media metering valve according to claim 1, wherein two o-rings are provided, each o-ring being mounted about the plunger on opposing sides of the bypass member.

4. The media metering valve according to claim 1, wherein the plurality of gaps formed between the surface of the plunger member and the bypass member is formed through the provision of a plurality of stepped recesses formed on an inner circumference of the bypass member.

5. The media metering valve according to claim 4, wherein a body of the bypass member functions as a barrier between the central bore and the chamber to minimise damage to the valve member due to the controlled release of the pressurised air and media from the chamber.

6. The media metering valve according to claim 5, wherein passing of the pressurised air and media from the chamber and through the plurality of stepped recesses formed in the bypass member generates a noise in the valve to confirm that a seal has been compromised.

7. A method of facilitating controlled failure of a media metering valve for introducing media into a pressurised fluid stream, the method comprising:

providing a seal between a body of the media metering valve and the pressurised fluid stream, said seal comprising a bypass member having a plurality of gaps formed between an inner diameter of the bypass member and a piston of the valve and at least one o-ring seated about the piston of the valve for forming a seal between the pressurized fluid stream and the valve; and upon failure of the at least one o-ring, facilitating controlled release of pressurised fluid into the valve through the plurality of gaps formed in the bypass member to provide pressure equalisation between the pressurised fluid stream and the valve.

* * * * *